(12) United States Patent
Chen et al.

(10) Patent No.: US 7,504,609 B2
(45) Date of Patent: Mar. 17, 2009

(54) PHASED-ARRAY LIGHT TELESCOPE

(75) Inventors: Chungte W. Chen, Irvine, CA (US); J. Steve Anderson, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 109 days.

(21) Appl. No.: 11/703,313

(22) Filed: Feb. 7, 2007

(65) Prior Publication Data

US 2008/0186569 A1 Aug. 7, 2008

(51) Int. Cl.
G02B 23/00 (2006.01)

(52) U.S. Cl. .................. 250/201.9; 359/419; 359/618

(58) Field of Classification Search ............ 250/201.9, 250/203.1, 203.2, 332; 359/419, 618, 631
See application file for complete search history.

(56) References Cited

U.S. PATENT DOCUMENTS

| | | | |
|---|---|---|---|
| 4,639,586 A * | 1/1987 | Fender et al. | ............ 250/201.9 |
| 4,825,062 A | 4/1989 | Rather et al. | |
| 4,831,246 A | 5/1989 | Wallentine et al. | |
| 4,950,063 A | 8/1990 | Pohle et al. | |
| 4,953,964 A | 9/1990 | Anafi et al. | |
| 5,093,563 A | 3/1992 | Small et al. | |
| 5,108,168 A | 4/1992 | Massie et al. | |
| 5,109,349 A | 4/1992 | Ulich et al. | |
| 5,113,284 A | 5/1992 | Stuhlinger | |
| 5,159,489 A | 10/1992 | Massie et al. | |
| 5,905,591 A | 5/1999 | Duncan et al. | |
| 6,057,550 A * | 5/2000 | Thoma et al. | ............ 250/352 |
| 6,832,020 B2 | 12/2004 | Okada et al. | |
| 7,009,764 B1 | 3/2006 | Sigler et al. | |
| 2003/0128445 A1 | 7/2003 | Rhoads | |
| 2003/0227696 A1 | 12/2003 | Maker | |
| 2005/0237644 A1 | 10/2005 | Rhoads | |

FOREIGN PATENT DOCUMENTS

WO WO 2004/049033 A 6/2004

* cited by examiner

*Primary Examiner*—Kevin Pyo
(74) *Attorney, Agent, or Firm*—Leonard A. Alkov

(57) ABSTRACT

A phased-array light telescope includes at least two non-obscured light subtelescopes. Each of the light subtelescopes is aimed along a common boresight. The phased-array light telescope further includes a non-obscured combining imager that receives and combines the output beams of the light subtelescopes.

20 Claims, 3 Drawing Sheets

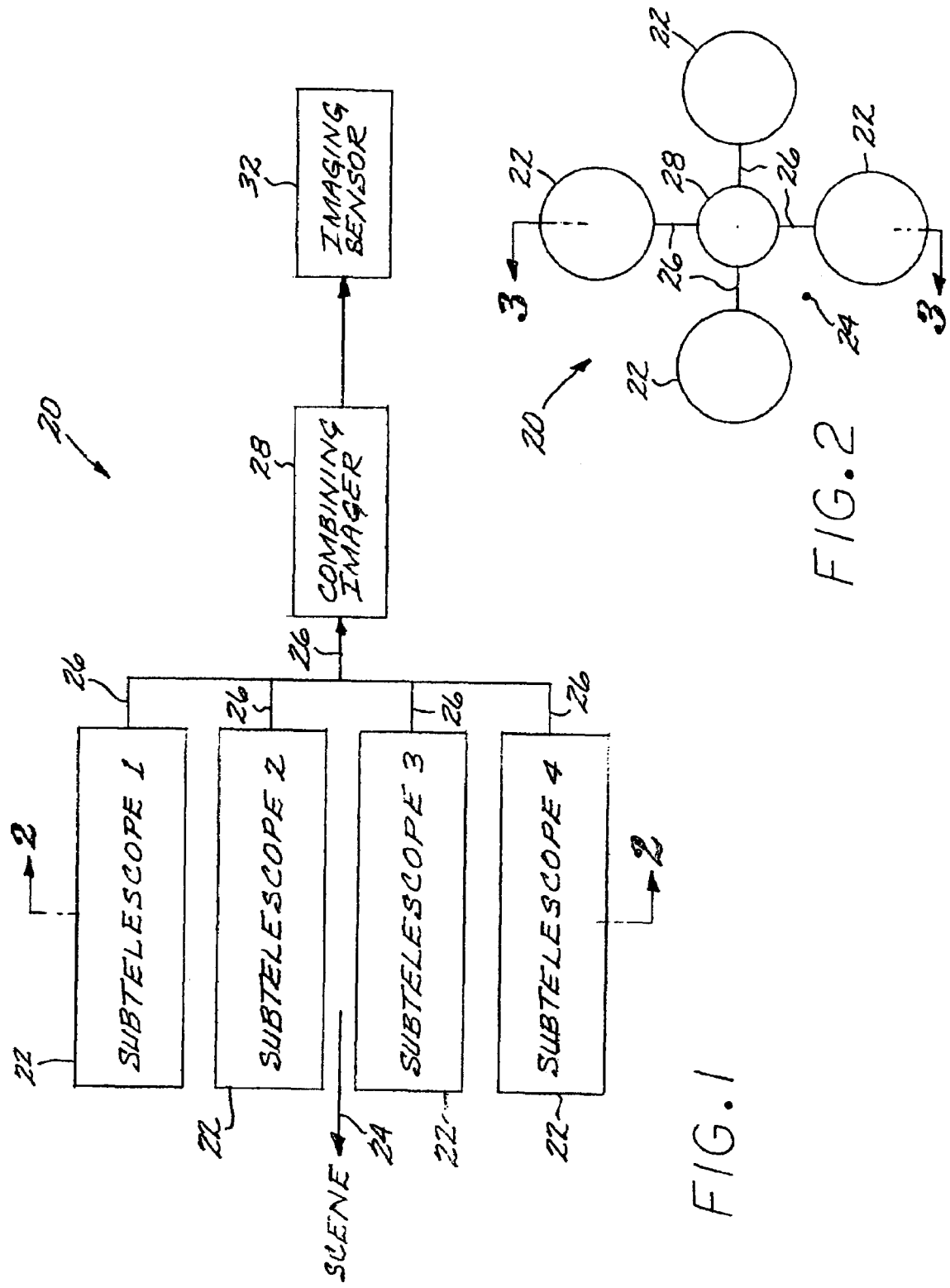

PHASED-ARRAY LIGHT TELESCOPE

This invention relates to a phased-array light telescope and, more particularly, to such a phased-array light telescope utilizing multiple non-obscured light telescopes and a non-obscured beam-combining imager.

BACKGROUND OF THE INVENTION

The light-gathering power, resolution, and signal-to-noise ratio of a light telescope improve as the aperture size of the telescope increases. There is therefore an incentive to build both ground-based and space-based light telescopes with larger aperture sizes. On the other hand, as the aperture size increases, the difficulties in fabricating the necessary optical components of the required optical perfection increases. The bulk and weight of the telescope also increase for larger aperture sizes, which may be a significant limitation for a space-based telescope.

The current goal is to build the next-generation light telescope for space applications with an aperture of 10 meters or more in diameter. (For comparison, the aperture of the monolithic Hubble space telescope is 2.4 meters.) It is unlikely that a monolithic light telescope with a 10 meter aperture could be constructed and transported from earth to space using available launch systems. One alternative design approach is a phased-array telescope having multiple sub-telescopes whose outputs are combined together.

The available designs for a phased-array telescope have significant limitations. With these designs, it is difficult to accomplish the beam combining of the individual light subtelescopes. Additionally, there is not a real exit pupil that permits the inclusion in the phased-array telescope of a dewar-contained infrared imaging sensor with a cold shield.

There is a need for an improved approach to a phased-array telescope. The present invention fulfills this need, and further provides related advantages.

SUMMARY OF THE INVENTION

The present invention provides a phased-array telescope with multiple non-obscured subtelescopes and a non-obscured combining imager. Distortions otherwise associated with the non-obscured subtelescopes and with the combining imager are corrected, so that a near-perfect combined image results. The combining imager can be designed with a real exit pupil, so that a dewar-contained infrared imaging sensor with a cold shield can be readily included in the phased-array light telescope.

In accordance with the invention, a phased-array light telescope comprises two non-obscured light subtelescopes. Each of the light subtelescopes is aimed along a common boresight, and each light subtelescope has an output beam. The phased-array light telescope further includes a non-obscured combining imager that receives and combines the output beams of the light subtelescopes. There may be at least one additional non-obscured light subtelescope, wherein the additional light subtelescope is aimed along the common boresight, and wherein the additional light subtelescope has its output beam. In this case, the non-obscured combining imager receives and combines the output beams of all of the light subtelescopes.

Each of the light subtelescopes preferably utilizes multimirror reflective optical components, and not refractive optical components. The combining imager also preferably utilizes multi-mirror reflective optical components, and not refractive optical components.

Each light subtelescope desirably comprises at least two fold mirrors for phase control. At least one of the fold mirrors of each light subtelescope is movable with respect to the other optical components of that respective light subtelescope to provide phase control.

Each light subtelescope desirably comprises at least one aspheric subtelescope mirror, and typically all of the subtelescope mirrors are aspheric. At least one of the subtelescope mirrors preferably has an astigmatic, conic astigmatic, or Zernike polynomial surface shape. Similarly, the combining imager desirably comprises at least one aspheric combiner mirror, and typically all of the combiner mirrors are aspheric.

It is strongly preferred that the combining imager has a real exit pupil. In that event, the phased-array light subtelescope may further include a cold shield having a cold shield aperture positioned at the real exit pupil, and an imaging sensor positioned so that the cold shield aperture lies between the imaging sensor and the combining imager. The imaging sensor and cold shield are preferably mounted within a dewar that maintains them at the reduced temperature desired for the operation of the imaging sensor.

Thus, in a preferred embodiment, a phased-array light telescope comprises at least two non-obscured, all-reflective light subtelescopes. Each of the light subtelescopes is aimed along a common boresight, and each light subtelescope has an output beam. Each light subtelescope comprises a subtelescope aspheric field mirror, and at least two fold mirrors for phase control. At least one of the fold mirrors is movable. A non-obscured, all-reflective combining imager receives and combines the output beams of the light subtelescopes. The combining imager comprises a combiner aspheric field mirror and has a real exit pupil. Other compatible features discussed herein may be used with this embodiment.

Most preferably, a phased-array light telescope comprises at least two non-obscured, all-reflective, multimirror light subtelescopes. Each of the light subtelescopes comprises a plurality of aspherical subtelescope mirrors. Each of the light subtelescopes is aimed along a common boresight, and each light subtelescope has an output beam. The phased-array light telescope further includes a non-obscured, all-reflective, multimirror combining imager that receives and combines the output beams of the light subtelescopes. The combining imager comprises a plurality of aspherical combiner mirrors, and the combining imager has a real exit pupil. Other compatible features discussed herein may be used with this embodiment.

The phased-array telescope uses non-obscured, off-axis subtelescopes. With such a design, there is a concern with distortions introduced into the light input beam. The subtelescope aspheric field mirror may be employed to correct any such distortions. The non-obscured, off-axis combining imager has a similar concern, and the combiner aspheric field mirror may be provided to similarly correct any such distortions in the combining imager.

The combining imager may be designed with a real exit pupil, that is, a pupil that lies between the last optical component and the image surface. A dewar may be positioned so that the real exit pupil lies within the dewar, and specifically so that a cold shield aperture of a cold shield within the dewar is positioned at the real exit pupil. The imaging sensor is located within the cold shield, so that the light passing through the cold shield aperture is incident upon the imaging sensor. This architecture greatly improves the signal-to-noise ratio of an infrared imaging sensor, because the cold shield acts to block spurious noise signals that would otherwise reach the infrared imaging sensor.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block diagram of a side view of an embodiment of a phased-array light telescope;

FIG. 2 is a schematic end elevational view of the embodiment of the phased-array light telescope of FIG. 1, taken on line 2-2;

DETAILED DESCRIPTION OF THE INVENTION

Figure 3:
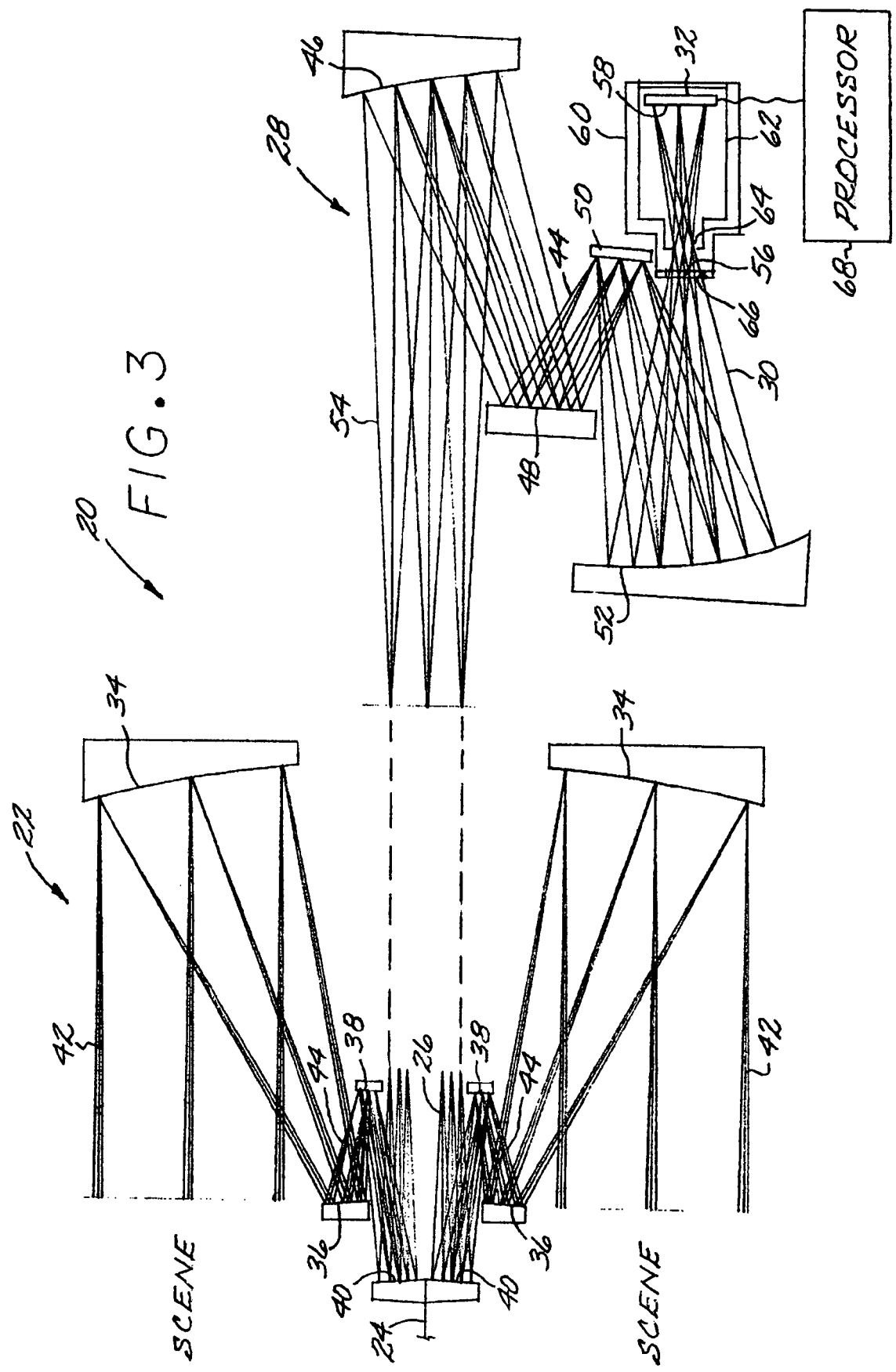
FIG. 3 is a schematic ray-path drawing of a reflective embodiment of the phased-array light telescope of FIGS. 1 and 2 taken along line 2-2 of FIG. 2, without movable fold mirrors.

FIGS. 1 and 2 schematically depict a phased-array light telescope 20. As used herein, "light" refers to energy in the ultraviolet, visible, and/or infrared wavelength ranges. The phased-array light telescope 20 comprises at least two non-obscured light subtelescopes 22. In this case, there are four light subtelescopes 22 arranged at 90 degrees angular separation around a circle, as shown in FIG. 2. Each of the light subtelescopes 22 is aimed along a common boresight 24, as depicted in FIG. 1. The common boresight 24 is perpendicular to the plane of the illustration of FIG. 2. There may be as few as two, three, four, or more than four light subtelescopes 22 in the phased-array light telescope 20. Each of the light subtelescopes 22 has an output beam 26.

A non-obscured combining imager 28 receives and combines the output beams 26 of the light subtelescopes 22. An output beam 30 of the combining imager 28 is typically provided to an imaging sensor 32.

FIG. 3 is a ray path drawing of one preferred physical embodiment of the phased-array light telescope 20 of FIGS. 1-2, showing the two in-plane light subtelescopes 22 (with the understanding that the out-of-plane light telescopes are present but not visible in the drawing). The elements described above in relation to FIGS. 1-2 are indicated in FIG. 3, and the prior descriptions are incorporated.

In the preferred embodiment, each of the light subtelescopes 22 is of a non-obscured, reflective configuration using only mirrors and no refractive elements such as lenses. (The present approach is also operable with refractive and mixed reflective/refractive subtelescopes 22, but the reflective approach is preferred because it facilitates the combining of the output beams.) Each of the illustrated light subtelescopes 22 includes a subtelescope primary mirror 34, a subtelescope secondary mirror 36, a subtelescope tertiary mirror 38, and a subtelescope quaternary mirror 40. At least one, and preferably all, of these mirrors 34, 36, 38, and 40 are aspheric. A combiner input light beam 42 from a scene reflects from the subtelescope primary mirror 34 to the subtelescope secondary mirror 36 to the subtelescope tertiary mirror 38 to the subtelescope quaternary mirror 40. In the illustrated light subtelescopes, the subtelescope primary mirror 34 has positive optical power, the subtelescope secondary mirror 36 has negative optical power, and the subtelescope quaternary mirror 40 has positive optical power. A subtelescope intermediate image is formed on the optical path 44 between the subtelescope secondary mirror 36 and the subtelescope quaternary mirror 40, and the subtelescope tertiary mirror 38 is located on the optical path 44 between the subtelescope secondary mirror 36 and the subtelescope quaternary mirror 40 near the subtelescope intermediate image. The subtelescope secondary mirror 36, the subtelescope tertiary mirror 38, and the subtelescope quaternary mirror 40 do not lie in the telescope input light beam 42 so as to partially obscure the subtelescope primary mirror 34, and this design of the light subtelescopes 22 is therefore termed "non-obscured".

Because the light subtelescopes utilize a non-obscured, off-axis configuration of the mirrors, there is an asymmetric distortion introduced into the light beam at its asymmetric reflection from the subtelescope primary mirror 34, as well as from asymmetric reflection from the subtelescope secondary mirror 36 and the subtelescope quaternary mirror 40. The subtelescope tertiary mirror 38 is provided to correct that distortion. The subtelescope tertiary mirror 38 is an aspheric subtelescope field mirror. The reflective surface shape of the subtelescope tertiary mirror 38 introduces into the optical path 44 the negative of the distortion introduced by the subtelescope primary mirror 34, the subtelescope secondary mirror 36, and the subtelescope quaternary mirror 40 associated with the geometry of the off-axis configuration, so that the output beam 22 is free of distortion. The subtelescope tertiary mirror 38 may have any required shape to accomplish the correction of the optical path 44, such as an astigmatic, conic astigmatic, or Zernike polynomial surface shape. The shape of the reflective surface of the subtelescope tertiary mirror is calculated by light ray-trace analysis using available computational programs such as the CODEV program available from Optical Research Associates.

In the preferred embodiment, the combining imager 28 is of a non-obscured, reflective configuration using only mirrors and no refractive elements such as lenses. (As noted above, however, the present approach is also operable with refractive and mixed reflective/refractive combining imagers 28, but the all-reflective design is preferred.) The combining imager 28 includes a combiner primary mirror 46, a combiner secondary mirror 48, a combiner tertiary mirror 50, and a combiner quaternary mirror 52. At least one, and preferably all, of these mirrors 46, 48, 50, and 52 are aspheric. A combiner input light beam 54 that includes the outputs from all of the light subtelescopes 22 (that is, the beams reflected from the subtelescope quaternary mirrors 40 of all of the light subtelescopes 22) reflects from the combiner primary mirror 46 to the combiner secondary mirror 48 to the combiner tertiary mirror 50 to the combiner quaternary mirror 52. In the illustrated combining imager 28, the combiner primary mirror 46 has positive optical power, the combiner secondary mirror 48 has negative optical power, and the combiner quaternary mirror 52 has positive optical power. A combiner intermediate image is formed on the optical path 44 between the combiner secondary mirror 48 and the combiner quaternary mirror 52, and the combiner tertiary mirror 50 is located on the optical path 44 between the combiner secondary mirror 48 and the combiner quaternary mirror 52 near the combiner intermediate image. The combiner secondary mirror 48, the combiner tertiary mirror 50, and the combiner quaternary mirror 52 do not lie in the combiner input light beam 54 so as to partially obscure the combiner primary mirror 46, and this design of the combining imager 28 is therefore termed "non-obscured".

Because the combining imager 28 utilizes a non-obscured, off-axis configuration of the mirrors, there is a distortion introduced into the light beam at its asymmetric reflection from the combiner primary mirror 46, as well as from asymmetric reflection from the combiner secondary mirror 48 and the combiner quaternary mirror 52. The distortion in the combining imager 28 is not as critical as that in the subtelescopes 22. Nevertheless, the combiner tertiary mirror 50 is desirably provided to correct that distortion. The combiner tertiary mirror 50 is a combiner aspheric field mirror. The reflective surface shape of the combiner tertiary mirror 50 introduces into the optical path 44 the negative of the distortion introduced by the combiner primary mirror 46, the combiner secondary mirror 48, and the combiner quaternary mirror 52 associated with the geometry of the off-axis configuration. The combiner tertiary mirror 50 may have any required shape to accomplish the correction of the optical path 44, such as an astigmatic, conic astigmatic, or Zernike polynomial surface shape. The shape of the reflective surface of the combiner tertiary mirror is calculated by light ray-trace analysis using available computational programs such as the CODEV program.

In the embodiment of FIG. 3, the combining imager has a real exit pupil 56. The real exit pupil 56 is between the combiner quaternary mirror 52 and an image surface 58 of the combining imager 28. That the combining imager 28 has the real exit pupil 56 is an important advantage in using the optics in conjunction with the imaging sensor 32. The imaging sensor 32 is typically operated inside a dewar 60, when the imaging sensor 32 is an infrared sensor, as is often the case. A cold shield 62 lies inside the dewar 60, and the imaging sensor 32 is positioned within the cold shield 62. A cold shield aperture 64 of the cold shield 62 is positioned at the real exit pupil 56, which is the location of minimal diameter for the output beam 30. The cold shield aperture 64 lies between the imaging sensor 32 and the combining imager 28. The output beam 30 of the combining imager 28 passes through a window 66 of the dewar 60, through the cold shield aperture 64 at the real exit pupil 56, and is incident upon the imaging sensor 32. The cold shield aperture 64 reduces infrared background noise that would otherwise reach the imaging sensor 32, resulting in a maximum signal-to-noise ratio.

The imaging sensor 32 converts the incident light of the output beam 30 into an electrical signal, which is provided to, and analyzed by, a processor 68.

In designing the phased-array light telescope 20, two important design rules are ideally incorporated into the computational programs. The first of these design rules is that $D_{en}/d_{ex}=M$, where $D_{en}$ is the separation of the entrance pupils of the individual light subtelescopes 22, and $d_{ex}$ is the separation of the exit pupils of the individual light subtelescopes 22. The second of the design rules is that $\sin \alpha = (\sin \alpha')/M$, where $\alpha$ is the input field of view and $\alpha'$ is the output field of view. If these rules are followed exactly, the output beams 26 of the light subtelescopes 22 are in phase for the field of view.

However, in practice, manufacturing tolerances and environmental effects such as thermal expansion and differential expansion may produce a minor, but perceptible, deviation from these design rules in the as-built and as-operated phased-array light telescope 20. The result of the deviation is that the images of the various light subtelescopes 22 may be out of phase and of a degraded quality.

Figure 4:
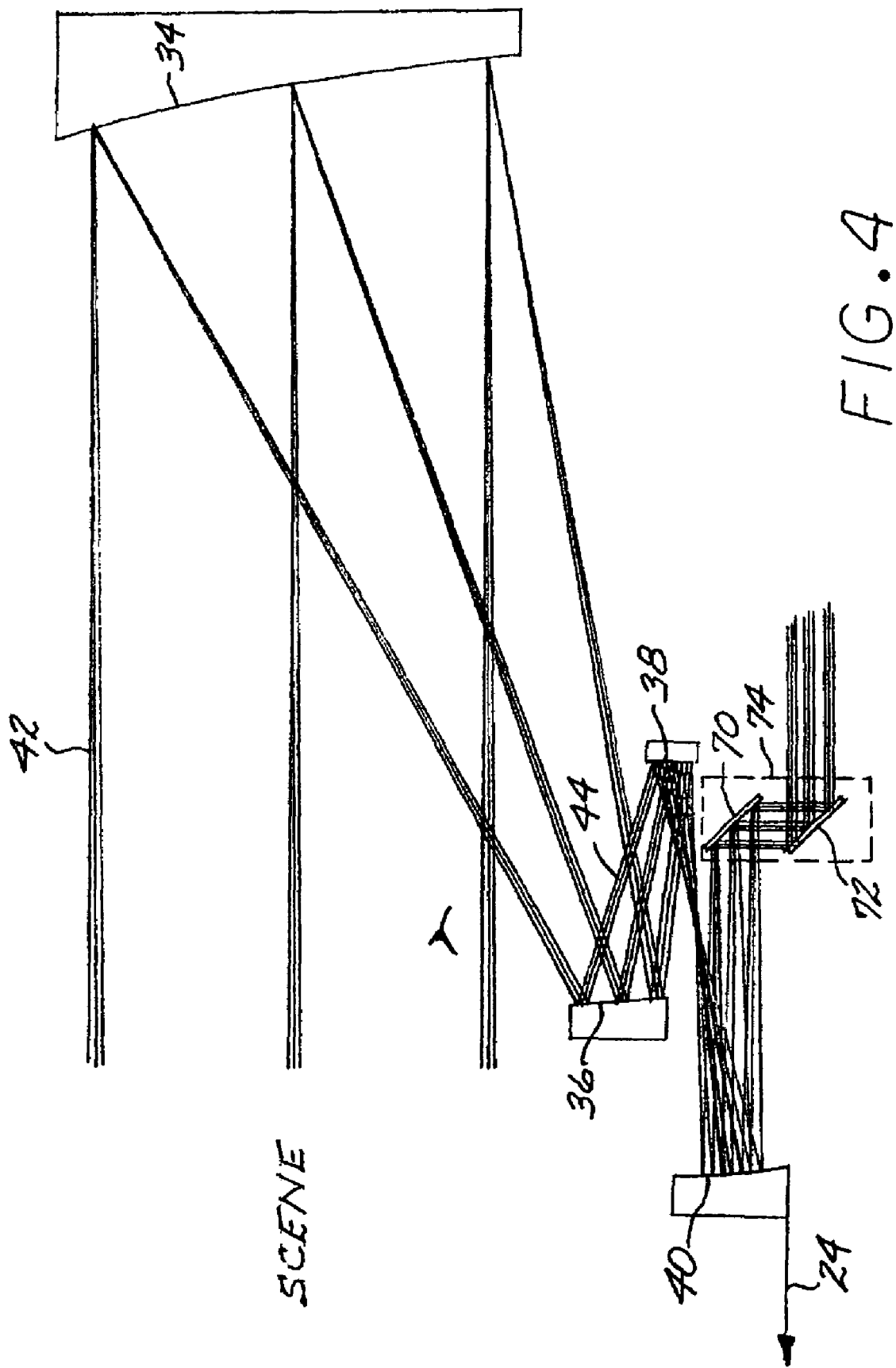
FIG. 4 is a schematic ray-path drawing of a portion of one of the subtelescopes of the reflective embodiment of the phased-array light telescope of FIG. 1, with fold mirrors.

FIG. 4 depicts an embodiment of the light subtelescope 22 that allows correction of the deviations. This embodiment may be used instead of the embodiment of the light subtelescope 22 illustrated in FIG. 3. Common elements have been assigned the same reference numerals in FIG. 4 as in FIG. 3, and the prior discussion is incorporated here. The embodiment of FIG. 4 includes, in addition to the elements of FIG. 3, at least two movable, optically unpowered, flat fold mirrors, here illustrated as exactly two movable fold mirrors 70 and 72. These flat fold mirrors 70 and 72 are movable with respect to the other reflective optical components, mirrors 34, 36, 38, and 40, to provide phase control for the light subtelescope 22 of which the flat fold mirrors 70 and 72 are a part. The flat fold mirrors 70 and 72 are mounted on a rotatable stage 74. The phase control is achieved by rotating the stage 74, and thence the flat fold mirrors 70 and 72, to slightly lengthen or shorten the optical path 44 in order to obtain an optimal phase relationship between the output beam of the various light subtelescopes 22. In another approach, one fold mirror may be moved relative to the other fold mirror along the longitudinal (optical axis) direction.

The optics of one form of the phased-array light telescope of FIG. 3 have been designed using the CODEV optical design program, and an optical prescription has been developed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A phased-array light telescope, comprising:
   two non-obscured light subtelescopes, wherein each of the light subtelescopes is aimed along a common boresight, and wherein each light subtelescope has an output beam; and
   a non-obscured combining imager that receives and combines the output beams of the light subtelescopes.

2. The phased-array light telescope of claim 1, wherein each of the light subtelescopes and the combining imager utilizes only reflective optical components and not refractive optical components.

3. The phased-array light telescope of claim 1, wherein each light subtelescope comprises at least two aspheric subtelescope mirrors.

4. The phased-array light telescope or claim 1, wherein each of the light subtelescopes comprises
   at least two fold mirrors, wherein at least one of the fold mirrors is movable to provide phase control.

5. The phased-array light telescope of claim 1, wherein each of the light subtelescopes utilizes only reflective optical components and not refractive optical components, and wherein the reflective optical components comprise at least two fold mirrors, wherein at least one of the fold mirrors is movable to provide phase control.

6. The phase-array light telescope of claim 1, wherein each light subtelescope comprises
   an aspheric subtelescope field mirror.

7. The phased-array fight telescope of claim 1, wherein each light subtelescope comprises a subtelescope mirror having an astigmatic, conic astigmatic, or Zernike polynomial surface shape.

8. The phased-array light telescope of claim 1, wherein the combining imager comprises at least two aspheric combiner mirrors.

9. The phase-array light telescope of claim 1, wherein the combining imager comprises
   an aspheric combiner field minor.

10. The phased-array light telescope of claim 1, wherein the combining imager has a real exit pupil.

11. The phased-array light telescope of claim 1, wherein the combining imager has a real exit pupil, and where the phased-array light subtelescope further includes a cold shield having a cold shield aperture positioned at the real exit pupil, and an imaging sensor positioned so that the cold shield aperture lies between the imaging sensor and the combining imager.

12. The phased-array light telescope of claim 1, farther including at least one additional non-obscured light subtelescope, wherein the additional light subtelescope is aimed along the common boresight, and wherein the additional light subtelescope has its output beam, and wherein the non-obscured combining imager receives and combines the output beams of all of the light subtelescopes.

13. A phased-array light telescope, comprising:

at least two non-obscured, all-reflective light subtelescopes, wherein each of the light subtelescopes is aimed along a common boresight, wherein each light subtelescope has an output beam, and wherein each light subtelescope comprises at least one subtelescope mirror, and at least two fold mirrors, wherein at least one of the fold minors is movable to provide phase control; and a non-obscured, all-reflective combining imager that receives and combines the output beams of the light subtelescopes. wherein the combining imager comprises at least one combiner mirror, and wherein the combining imager has a real exit pupil.

14. The phase-array light telescope of claim 13, wherein each light subtelescope comprises an aspheric subtelescope field mirror, and wherein the combining imager comprises an aspheric combiner field mirror.

15. The phased-array light telescope of claim 13, wherein each light subtelescope comprises a subtelescope mirror having an astigmatic, conic astigmatic, or Zernike polynomial surface shape.

16. The phased-array light telescope of claim 13, wherein the phased-array light subtelescope further includes a cold shield having a cold shield aperture positioned at the real exit pupil, and an imaging sensor positioned so that the cold shield aperture lies between the imaging sensor and the combining imager.

17. A phased-array light telescope, comprising:

at least two non-obscured, all-reflective, multimirror light subtelescopes, wherein each of the light subtelescopes comprises a plurality of aspherical subtelescope mirrors including an aspheric subtelescope field mirror, wherein each of the light subtelescopes is aimed along a common boresight, and wherein each light subtelescope has an output beam; and a non-obscured, all-reflective, multimirror combining imager that receives and combines the output beams of the light subtelescopes, wherein the combining imager comprises a plurality of aspherical combiner mirrors including an aspheric combiner field mirror, and wherein the combining imager has a real exit pupil.

18. The phased-array light telescope of claim 17, wherein each of the light subtelescopes comprises at least two fold mirrors, wherein at least one of the fold mirrors is movable to provide phase control.

19. The phased-array light telescope of claim 17, wherein the phased-array light subtelescope further includes a cold shield having a cold shield aperture positioned at the real exit pupil, and an imaging sensor positioned so that the cold shield aperture lies between the imaging sensor and the combining imager.

20. The phased array light telescope of claim 1, wherein each subtelescope is an off-axis configuration.

* * * * *